(12) United States Patent
Shieh et al.

(10) Patent No.: US 8,955,093 B2
(45) Date of Patent: Feb. 10, 2015

(54) COOPERATIVE NETWORK SECURITY INSPECTION

(71) Applicants: Choung-Yaw Michael Shieh, Palo Alto, CA (US); Meng Xu, Los Altos, CA (US); Yi Sun, San Jose, CA (US); Jia-Jyi Roger Lian, Saratoga, CA (US)

(72) Inventors: Choung-Yaw Michael Shieh, Palo Alto, CA (US); Meng Xu, Los Altos, CA (US); Yi Sun, San Jose, CA (US); Jia-Jyi Roger Lian, Saratoga, CA (US)

(73) Assignee: Varmour Networks, Inc., Santa Clara, CA (US)

( * ) Notice: Subject to any disclaimer, the term of this patent is extended or adjusted under 35 U.S.C. 154(b) by 118 days.

(21) Appl. No.: 13/860,408

(22) Filed: Apr. 10, 2013

(65) Prior Publication Data

US 2013/0291088 A1 Oct. 31, 2013

Related U.S. Application Data

(60) Provisional application No. 61/686,828, filed on Apr. 11, 2012.

(51) Int. Cl.
*H04L 29/06* (2006.01)

(52) U.S. Cl.
CPC ........ *H04L 63/0218* (2013.01); *H04L 63/0263* (2013.01); *H04L 63/0227* (2013.01)
USPC .......... 726/11; 726/1; 726/4; 726/13; 726/15; 713/153; 713/163; 713/201

(58) Field of Classification Search
CPC .............. H04L 63/028; H04L 63/0227; H04L 63/0263; H04L 12/585; H04L 12/2602
USPC ......... 726/1, 4, 11–15, 23; 713/153, 163, 201
See application file for complete search history.

(56) References Cited

U.S. PATENT DOCUMENTS

| | | | |
|---|---|---|---|
| 2004/0093513 A1* | 5/2004 | Cantrell et al. | 713/201 |
| 2010/0132031 A1* | 5/2010 | Zheng | 726/13 |

\* cited by examiner

*Primary Examiner* — Kambiz Zand
*Assistant Examiner* — Noura Zoubair
(74) *Attorney, Agent, or Firm* — Blakely, Sokoloff, Taylor & Zafman LLP (57) ABSTRACT

A network system includes a security device and a network access device. The network access device is to receive a packet from a source node destined to a destination node, and to examine a data structure maintained by the network access device to determine whether the data structure stores a data member having a predetermined value, the data member indicating whether the packet should undergo security processing. If the data member matches the predetermined value, the packet is transmitted to a security device associated with the network access device to allow the security device to perform content inspection, and in response to a response received from the security device, the packet is routed to the destination node dependent upon the response. The packet is routed to the destination node without forwarding the packet to the security device.

21 Claims, 10 Drawing Sheets

| Session/Flow ID | Address(es) of Security Processing Module(s) | Bypass Flag 501 | Notification Event(s) 502 | Filtering Rule(s) 503 |
|---|---|---|---|---|
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

COOPERATIVE NETWORK SECURITY INSPECTION

RELATED APPLICATIONS

This application claims the benefit of U.S. Provisional Patent Application No. 61/686,828, filed Apr. 11, 2012, which is incorporated by reference in its entirety.

FIELD OF THE INVENTION

Embodiments of the present invention relate generally to network security. More particularly, embodiments of the invention relate to enabling network security with network equipment.

BACKGROUND

Network security devices are designed to be put in the data path of the network traffic in order to inspect and control the network traffic. A popular way to deploy network security is so called "bump-in-the-wire" that the devices are deployed in the data path for security inspection. However, it may not be practical to deploy security devices on every data path of network traffic in a data center. There are also needs to be able to flexibly perform security inspection on different parts of networks. The traditional bump-in-the-wire deployment cannot fulfill the needs.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is utilized to dynamically perform security inspection in a network. In one embodiment, the mechanism includes two functions: 1) an input/output (IO) function that performs the distribution of network traffic; and 2) a security-processing function that performs security processing, including security inspection and policy enforcement. The IO function receives the packets and uses a session table to forward the packets to the security-processing function. A session table is a data structure that stores connection states, including the destination of the security-processing function. In one embodiment, the IO function determines, based on an internal data structure such as a session or flow table, whether the packet should be forwarded to the security processing function for security inspection. The configuration of the IO function to control whether to forward the packets to the security processing function can be set based on a command received from an administrator or alternatively, based on a signal received from the security processing function.

According to one embodiment, an administrator can configure, for example, via a controller or a management entity, a network access device to set up a set of filtering rules specifying whether and/or what types of packets should be forwarded to a security device and which of the security devices for security inspection. In this embodiment, the controller is configured to manage multiple network access devices and/or multiple security devices. Alternatively, a security device may inform a network access device that subsequent packets of a particular session should be forwarded from the network access device for security inspection. In one embodiment, a security device performs the security inspection at the beginning of the flow or session, and at a certain point, the security device decides that it no longer needs to inspect further packets of the same session.

Advantages of embodiments of the present invention include, without limitation, providing a way to integrate partial network security functions into other network equipment, such as switches or routers. The integration allows network administrators to turn on security inspection functionality when there are needs for such, thus one can flexibly perform security inspection if needed. The notification between I/O functions and security-processing functions can reduce the number of packets to be inspected, thus enhancing the performance without lax the network security.

Figure 1:
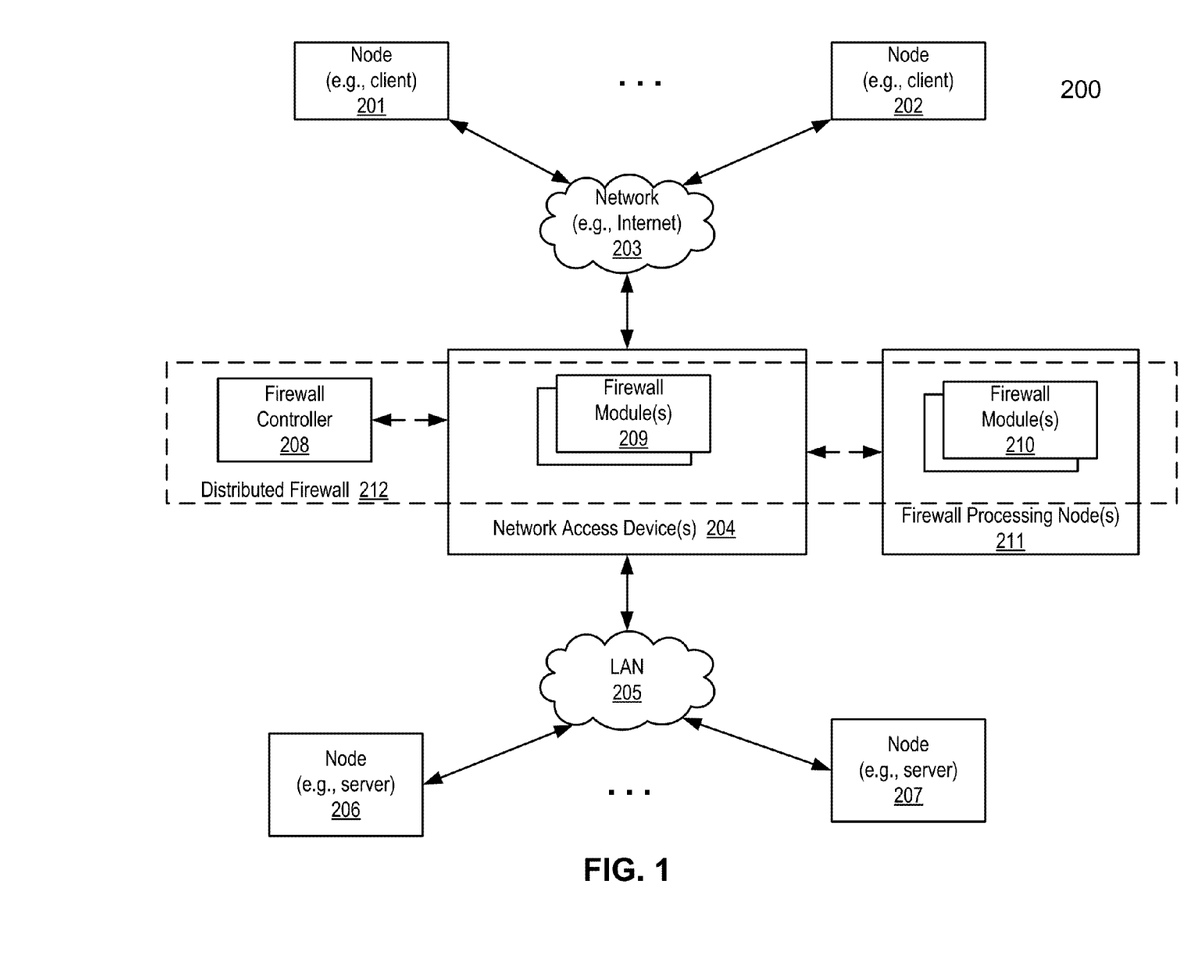
FIG. 1 is a block diagram illustrating an example of a network configuration according to one embodiment of the invention.

FIG. 1 is a block diagram illustrating an example of network configuration according to one embodiment of the invention. Referring to FIG. 1, network access device 204, which may be a router or gateway, a switch or an access point, etc., provides an interface between network 203 and network 205. Network 203 may be an external network such as a wide area network (WAN) (e.g., Internet) while network 205 represents a local area network (LAN). Nodes 206-207 go through gateway device 204 in order to reach nodes 201-202, or vice versa. Any of nodes 201-202 and 206-207 may be a client device (e.g., a desktop, laptop, Smartphone, gaming device) or a server.

According to one embodiment, network access device 204 is associated with a distributed firewall 212 that includes various firewall processing modules, for example, each being executed within a virtual machine (VM). In one embodiment, each firewall module is responsible for performing one or more firewall functions, but it does not include all of the firewall functions of a firewall. Examples of the firewall functions include, but are not limited to, network address translation (NAT), virtual private network (VPN), deep packet inspection (DPI), and/or anti-virus, etc. In one embodiment, some of the firewall processing modules are located within network access device 204 (e.g., firewall modules 209) and some are located external to network access device 204 (e.g., firewall modules 210 maintained by firewall processing node(s) 211, which may be a dedicated firewall processing machine. All of the firewall modules 209-210 are managed by firewall controller 208, which may be located within network access device 204, or external to network access device 204, such as, for example, in a public cloud associated with network 203, or in a private cloud associated with network 205. Controller 208 and firewall processing modules 209-210 collectively are referred to herein as distributed firewall 212.

A virtual machine represents a completely isolated operating environment with a dedicated set of resources associated therewith. A virtual machine may be installed or launched as a guest operating system (OS) hosted by a host OS. In one embodiment, a host OS represents a virtual machine monitor (VMM) (also referred to as a hypervisor) for managing the hosted virtual machines. A guest OS may be of the same or different types with respect to the host OS. For example, a guest OS may be a Windows™ operating system and a host OS may be a LINUX operating system. In addition, the guest operating systems (OSes) running on a host can be of the same or different types. A virtual machine can be any type of virtual machine, such as, for example, hardware emulation, full virtualization, para-virtualization, and operating system-level virtualization virtual machines. Different virtual machines hosted by a server may have the same or different privilege levels for accessing different resources.

Figure 5:
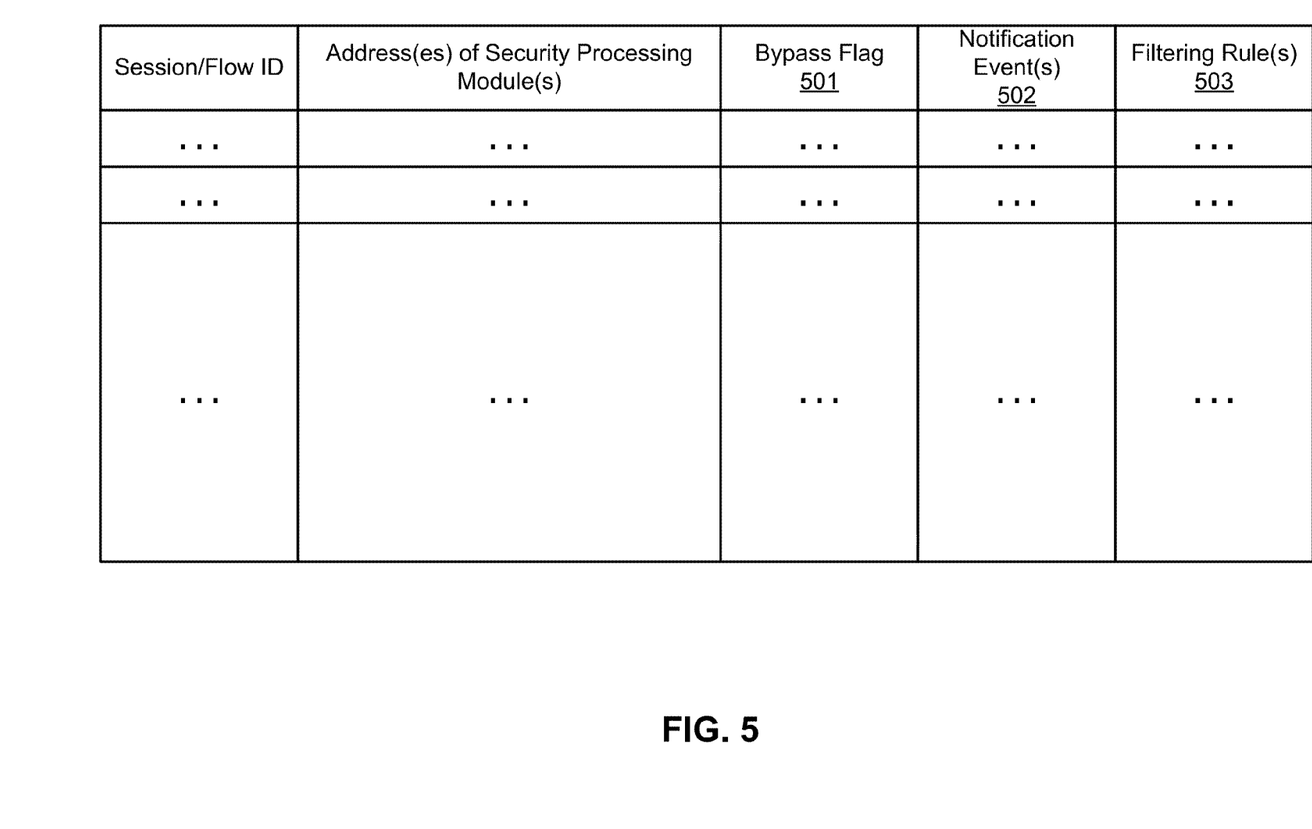
FIG. 5 is a block diagram illustrating a forwarding table according to one embodiment of the invention.

According to one embodiment, a mechanism is utilized to dynamically perform security inspection in a network. In one embodiment, the mechanism includes two functions: 1) an input/output (IO) function (e.g., firewall module(s) 209) that performs the distribution of network traffic; and 2) a security-processing function (e.g., firewall module(s) 210) that performs security processing, including security inspection and policy enforcement. IO function 209 receives the packets and uses a session table to forward the packets to security-processing function 210. A session table is a data structure that stores connection states, including the destination of security-processing function. In one embodiment, IO function 209 determines, based on an internal data structure such as a session or flow table (e.g., session table as shown in FIG. 5), whether the packet should be forwarded to security processing function 210 for security inspection. The configuration of IO function 209 to control whether to forward the packets to security processing function 210 can be set based on a command received from an administrator or alternatively, based on a signal received from security processing function 210.

Figure 2A:
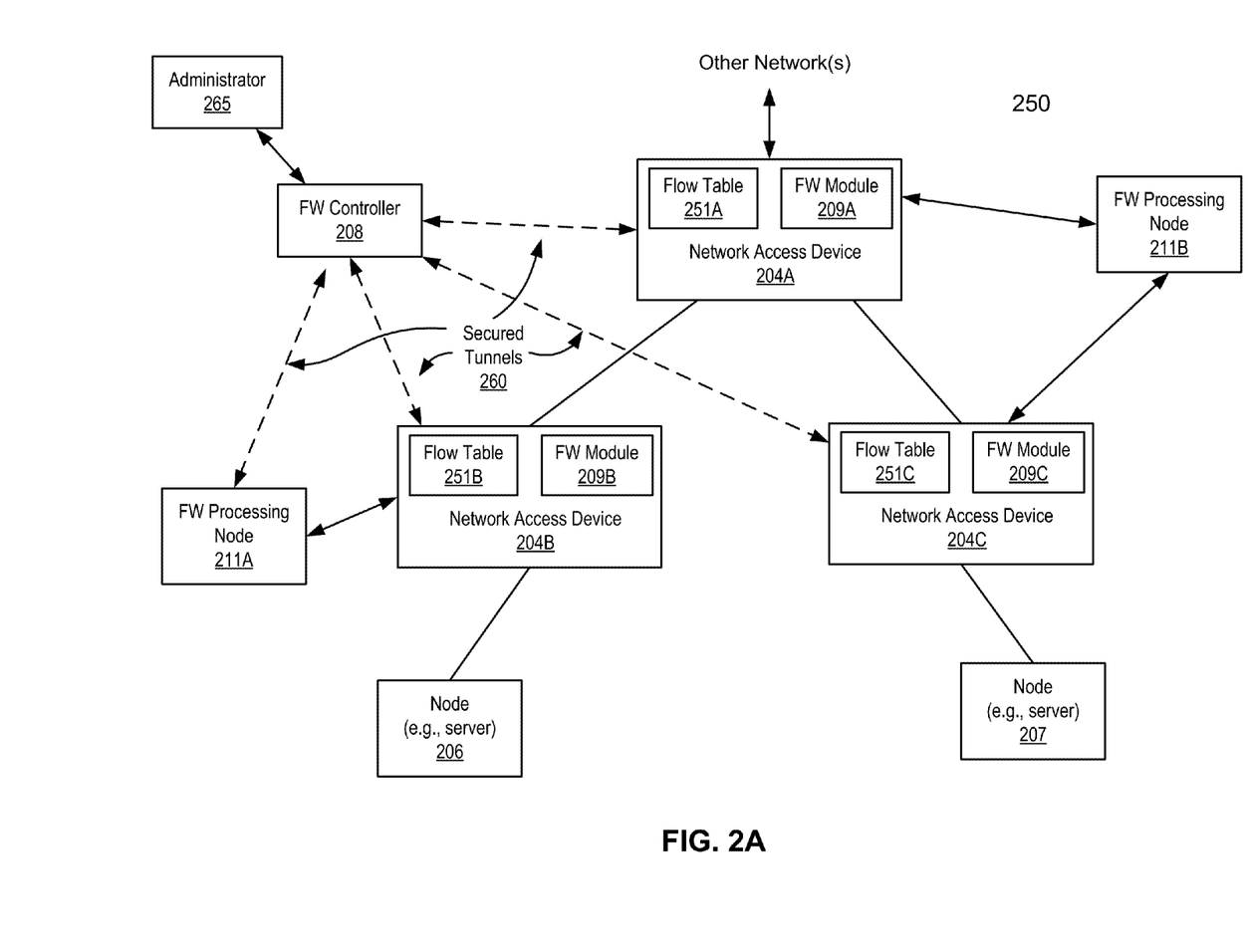
FIG. 2A is a block diagram illustrating an example of a network configuration according to another embodiment of the invention.

FIG. 2A is a block diagram illustrating an example of network configuration according to another embodiment of the invention. System 250 may represent at least part of system 200 as shown in FIG. 1. Referring to FIG. 2A, in this embodiment, multiple network access devices such as devices 204A-204C are arranged in a hierarchical structure, where each network access device provides an interface of a corresponding LAN or local network segment to an external network. For example, network access device 204B provides an interface of a LAN having at least one member such as node 206 to an external network or network segment that is hosted by network access device 204A. Similarly, network access device 104C provides an interface for its members such as node 207. The LANs associated with network access devices 204B-204C may be located within a physical site or a data center or alternatively, they may be allocated across multiple physical sites or data centers.

According to one embodiment, each of network access devices 204A-204C maintains a persistent connection such as secure connections or tunnels 260 with a controller or management entity 208 for exchanging management messages and configurations, or distributing routing information to network access devices 204A-204C, etc. In one embodiment, controller 208 communicates with each of the network access devices 204A-204C using a management protocol such as the OpenFlow™ protocol. OpenFlow is a Layer 2 communications protocol (e.g., media access control or MAC layer) that gives access to the forwarding plane of a network switch or router over the network. In simpler terms, OpenFlow allows the path of network packets through the network of switches to be determined by software running on multiple routers (minimum two of them, primary and secondary, having a role of observers). This separation of the control from the forwarding allows for more sophisticated traffic management than is feasible using access control lists (ACLs) and routing protocols.

The OpenFlow technology consists of three parts: flow tables installed on switches, a controller, and an OpenFlow protocol for the controller to talk securely with switches. Flow tables are set up on switches or routers. Controllers talk to the switches via the OpenFlow Protocol, which is secure, and impose policies on flows. For example, a simple flow might be defined as any traffic from a given IP address. The rule governing it might be to route the flow through a given switch port. With its knowledge of the network, the controller could set up paths through the network optimized for speed, fewest number of hops or reduced latency, among other characteristics. Using OpenFlow takes control of how traffic flows through the network out of the hands of the infrastructure, the switches and routers, and puts it in the hands of the network owner (such as a corporation), individual users or individual applications.

Referring back to FIG. 2A, in one embodiment, each of the network access devices 204A-204C maintains a flow table or session table (e.g., flow tables 251A-251C) and a firewall module (e.g., 209A-209C). A network flow refers to a sequence of packets from a source computer to a destination, which may be another host, a multicast group, or a broadcast domain. For example, a TCP/IP flow can be uniquely identified by the following parameters within a certain time period: 1) Source and Destination IP address; 2) Source and Destination Port; and 3) Layer 4 Protocol (TCP/UDP/ICMP). A session is a semi-permanent interactive information interchange, also known as a dialogue, a conversation or a meeting, between two or more communicating devices. A session is set up or established at a certain point in time and torn down at a later point in time. An established communication session may involve more than one message in each direction. A session is typically, but not always, stateful, meaning that at least one of the communicating entities needs to save information about the session history in order to be able to communicate, as opposed to stateless communication, where the communication consists of independent requests with responses. Flow tables 251A-251C may be implemented as a combination of a flow table and a session table.

Firewall modules 209A-209C may be part of a distributed firewall described above. For example, firewall modules 209A-209C may be the IO functions of a firewall while nodes 211A-211B may be firewall processing nodes. That is, modules 211A-211B may be dedicated firewall processing devices that perform some firewall processing operations such as DPI, content inspection, antivirus, etc., while firewall modules 209A-209C are responsible for routing data packets. For example, when firewall module 209B receives a packet from node 206, it may forward the packet to firewall processing node 211A for content inspection and/or forwards the packet to controller 208 for routing information. In response, firewall processing node 211A analyzes the received packet and/or further communicates with controller 208. Controller 208 may provide further routing information back to network access device 204B regarding how to route the packet. Each of the firewall processing nodes 211A-211B may further maintains a persistent connection or tunnel with controller 208, for example, using the OpenFlow communication protocol.

According to one embodiment, an administrator 265 configures, for example, via a controller or a management entity 208, a network access device (e.g., network access devices 204A-204C) to set up a set of filtering rules concerning whether and/or what types of packets should be forwarded to a security device and which of the security devices (e.g., security devices 211A-211B) for security inspection. In this embodiment, controller 208 is configured to manage multiple network access devices 204A-204C and/or multiple security devices 211A-211B. Alternatively, a security device, such as security device 211A, may inform a network access device, such as network access device 204B, whether subsequent packets of a particular session should be forwarded from the network access device for security inspection. A security device may perform the security inspection on packets at the beginning of the flow or session, and at a certain point, the security device decides that it no longer needs to inspect further packets of the same session.

The configuration information may be stored in a memory or storage device of a network access device. In one embodiment, such configuration information may be stored as part of a flow table or session table as shown in FIG. 5. Referring to FIG. 5, a bypass flag 501 may be received from a security device indicating that the security device no longer wishes to receive further packets of the same session for security inspection. In addition, a security device may register certain notification events 502 with a network access device, such that when the network access device detects such events, it will notify the security device. Further, a set of one or more filtering rules 503 may be received from an administrator to filter and send only certain types of packets to a security device for inspection.

According to one embodiment, referring back to FIG. 2A, when a security-processing function (e.g., processing node 211A) receives the packets, it does the security inspection and security policy enforcement. The packets then are forwarded to the next I/O function (e.g., modules 209A-209C). The choices of the next I/O function could be from the decision from layer 2 such as Ethernet MAC address lookup, or IP address routing, or other methods.

To be able to flexibly apply network security into the network, in one embodiment of the invention the I/O function (e.g., module 209B) is integrated with existing network equipment, such as network switches or routers (e.g., network access device 204B). The integration of I/O functions could be onto physical network switches or virtual software switches. The security-processing function is processed on separate network security devices.

The I/O function does a couple of operations when it receives the packets. The first is to look up the connection to which the packets belong to. It performs a lookup into the session table (e.g., table 251B) to determine if it has previously processed any packets of the connection. If the connection state has been in the session table, it can determine where the security-processing function is then forward the packet. If it cannot find the connection in the session table, it can either forward to any known security-processing function, or another network devices to determine to which security-processing function to forward the packets.

Once the network switches integrate the security I/O functions, one can easily turn on or off network security in networks. If network administrators want to apply security policies to networks, they can turn on the I/O functions on the network equipment. The packets then are forwarded to the security-processing functions for security inspection and policy enforcement. The administrators can apply a filter to the I/O functions so that only interested packets are forwarded to security-processing function. The administrators can turn off the I/O functions to skip the security inspection.

An embodiment of the invention also controls the communication between I/O functions and security-processing functions to enable packets to bypass security-processing function if there is no more need to inspect the packets of the connection. Some of the security functions do not need to inspect all the packets of a connection. For examples, to identify the application of a connection, there may be only need to inspect first four or five packets to make the identification. In this case, the security-processing function can notify I/O functions to bypass the security-processing function for the rest of the packets of the connections. Once the I/O function receives the notification, it will forward the packets out without redirecting the packets to the security-processing functions. This would greatly improve the performance even when security inspection is turned on.

During the bypass phase, the I/O function may notify the security-processing function if there are special events in the packet stream. These events could be receipt of TCP FIN or TCP RST packets, or not receiving any packets of the connection within a time threshold. The notification from I/O functions to security processing functions could help to clean up the state in the security-processing nodes.

Figure 2B:
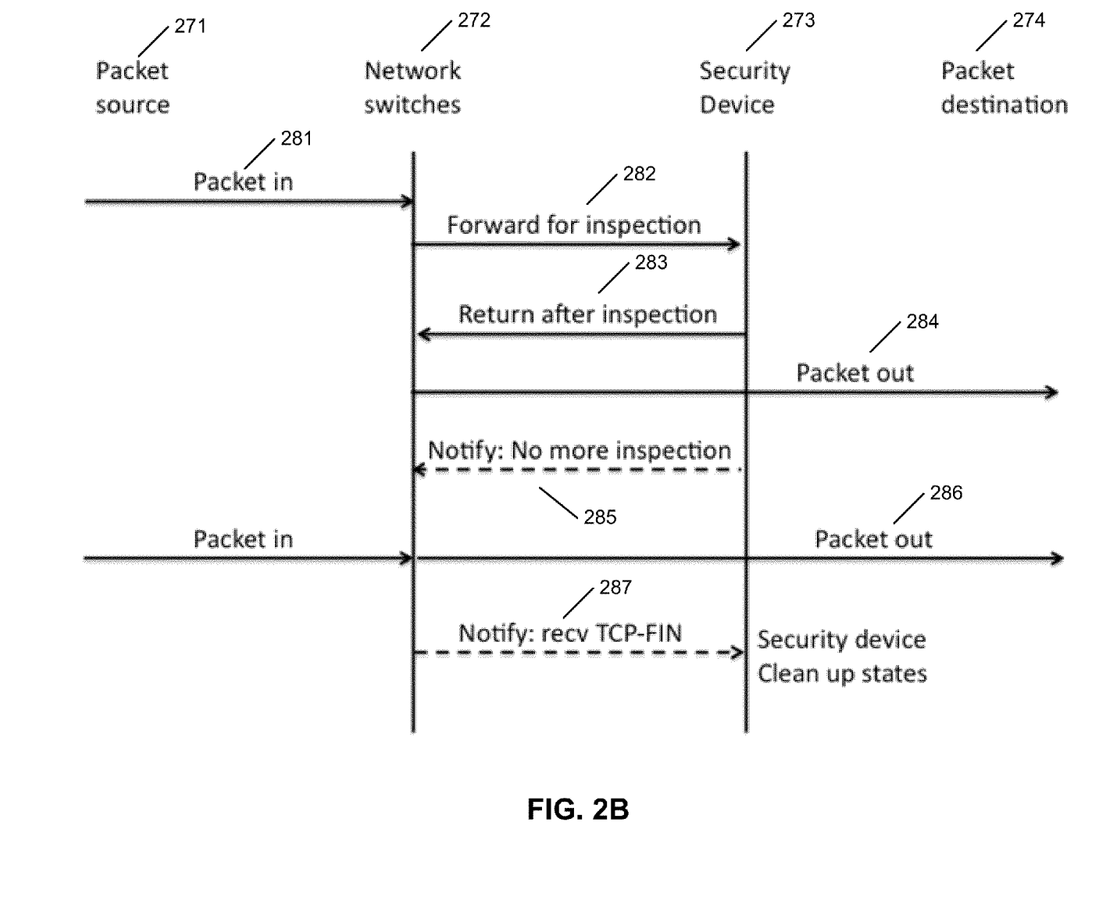
FIG. 2B is a processing flow diagram illustrating a process of security inspection according to one embodiment of the invention.

FIG. 2B is a processing flow diagram illustrating a process of security inspection according to one embodiment of the invention. Referring to FIG. 2B, as an example, network switch 272 may represent any of network access devices 204A-204C and security device 273 may represents any of security processing devices 211A-211B as described above with respect to FIG. 2A. When device 272 receives a packet from a source node 271 via transaction 281, device 272 may determine whether the packet should be forwarded to security device 273. For example, device 272 may look up in its session table such as the one as shown in FIG. 5 to determine whether a bypass flag has been set to a predetermined value. If the bypass flag matches the predetermined value, the packet is forwarded to security device 273 via path 282; otherwise, the packet is routed to destination node 274. Alternatively, if there is no entry in the session table corresponding to the current session, the packet will also be transmitted to security device 273. After network device 272 receives a response from security device 273 via path 283, dependent upon the response, the packet may then be routed to destination node 274 via path 284. These processes may continue until a notification is received from security device 273 via path 285 indicating that it no longer wishes to receive further packets of the same session for inspection, such that subsequent packets will be directly routed to destination node 274 via path 286 without routing to security device 273. If there are certain events that have been registered from security device 273, network device 272 may notify security device 274 via path 287 upon detecting the registered events.

Figure 3:
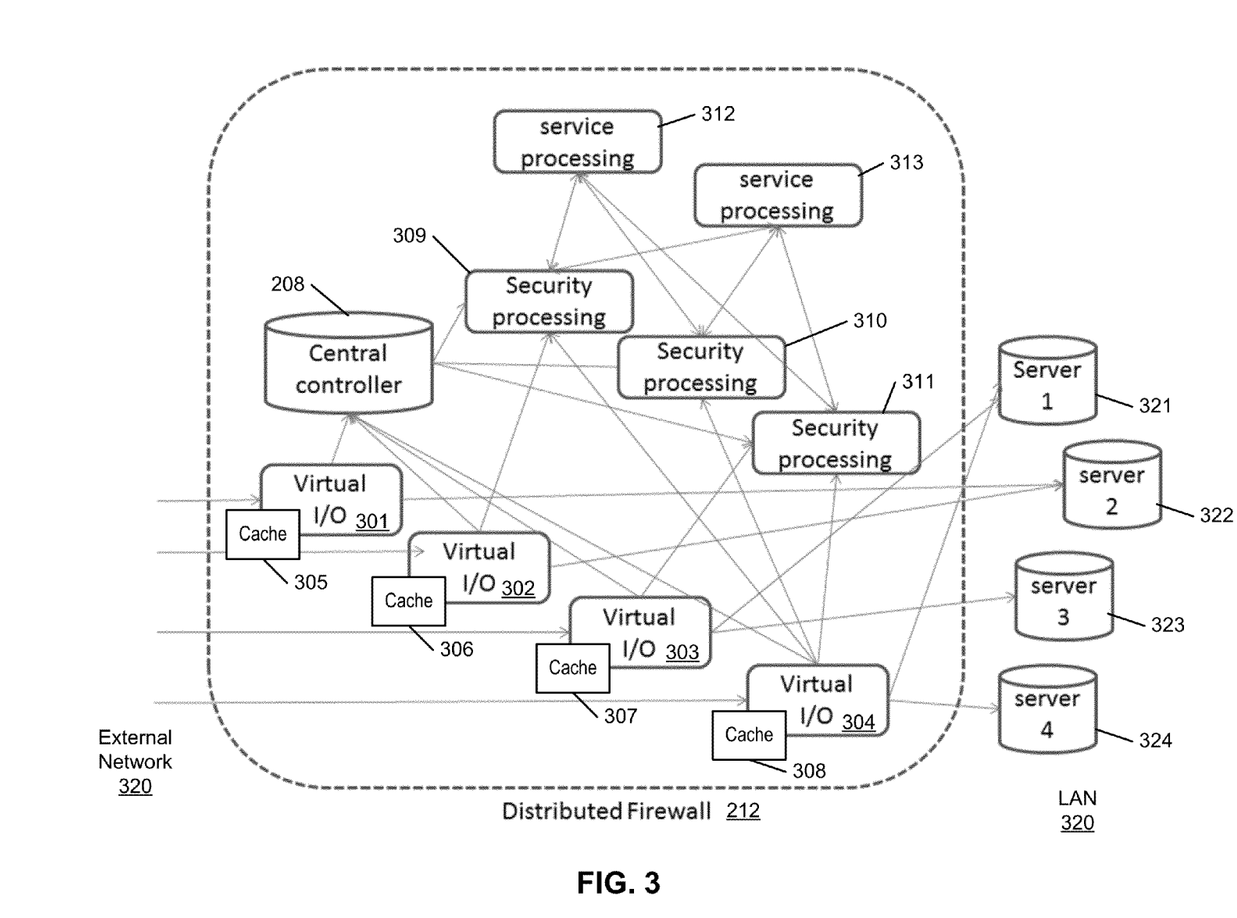
FIG. 3 is a block diagram illustrating an example of a distributed firewall according to one embodiment of the invention.

FIG. 3 is a block diagram illustrating an example of a distributed firewall according to one embodiment of the invention. Referring to FIG. 3, distributed firewall 212 includes, for the purpose of illustration, four different types of modules: virtual I/O modules 301-304, security processing modules 309-311, service processing modules 312-313, and central controller 208. All these modules can run on the same virtual machine, or on different virtual machines, or on same or different physical hosts. In one embodiment, the communication protocol between the modules is IPC (inter-process communication) if they run on the same memory space, use layer-2 network protocol if they are on the same layer-2 network, or use IP protocols if they are connected through IP networks. Some or all of modules 301-304 and 309-313 may be executed within a virtual machine. Dependent upon the specific configuration, each of modules 301-304 and 309-313 may be executed by a respective virtual machine. In other configurations, multiple of modules 301-304 and 309-313 may be executed by the same virtual machine.

An I/O module running within a virtual machine is referred to herein as a virtual I/O module. Each of virtual I/O modules 301-304 receives packets from any of servers 321-324 of LAN 320 and sends packets to external network 315 outside of the firewall. In one embodiment, each of I/O modules 301-304 keeps a local cache (e.g., caches 305-308) storing location(s) of a security processing module(s) (e.g., security processing modules 309-311) for each connection session. A cache maintained by each I/O module contains a forwarding table mapping certain connection sessions to any of security modules 309-311. An example of a forwarding table is shown in FIG. 5. Upon receiving a packet, an I/O module performs a packet classification to find out the associated connection and forwards the packet to the corresponding security processing module identified by the forwarding table. If it cannot find the connection in its local cache, the packets are forwarded to central controller 208 for processing. In such a case, controller 208 assigns the connection to one of security processing modules 309-311 based on one or more of a variety of factors such as load balancing. The virtual I/O modules 302-304 can be located at multiple locations of the networks to receive and send out packets.

In one embodiment, each of security processing modules 309-311 performs major security processing functions, such as, for example, NAT, VPN, DPI, and/or anti-virus, etc. A security processing module receives packets and runs the packets through one or more various security functions in the module for security processing. There could be several security modules and each handles the same or different security functions. If the packets need to go through another security or service processing, the module sends the packets to the other modules. Optionally, it can run the packets through a load balancing mechanism to distribute the load to multiple modules. If a module is the last processing module in the chain to process the packets, it can forward the packets back to the virtual I/O module to send out, or send the packet out directly to its destination if it's configured to do so.

In one embodiment, each of service processing modules 312-313 performs one or more of the functions of security processing module, such as, for example, NAT, VPN, DPI, and/or anti-virus, etc. However, it is different from the security processing module in that it only receives and sends packets to the same security processing module. If the tasks cannot be done in a security processing module, for example, due to a resource limitation, system load, or the requirement of a different operation system, the packets can be forwarded to one or more of service processing modules 312-313 for further processing. The packets then are sent back to the same security processing module for the next security function processing. To further share the system load, any of security processing modules 309-311 can load balance the computational-intensive services using multiple service processing modules.

In one embodiment, central controller 208 is the central place to control forwarding of the packets amongst I/O modules 301-304, security processing modules 309-311, and service processing modules 312-313. When a virtual I/O module receives a packet, according to one embodiment, it forwards the packet to central controller 208 if it cannot find an existing connection in its local cache, as shown in FIG. 5. When central controller 208 receives the packet, it decides which of security processing modules 309-311 is able to process the packets, and then forwards the packets to the designated security processing module. It also instructs the virtual I/O module to create the local cache to store connection state information so the subsequent packets of the same connection session do not need to be forwarded to central controller 208; rather, they can be directly forwarded to the proper security processing module identified in the cache.

By dividing a firewall into different modules, it allows putting virtual I/O and security processing functions at the best locations to protect the network entrance, while keeping the central control and monitoring functionality at the central controller. It also enhances the scalability of the system since all modules can be expanded to multiple instances to share the system load. Note that a service processing module is optional in the architecture, as it is only required when there are needs to use additional resources to handle the security functions.

Figure 6:
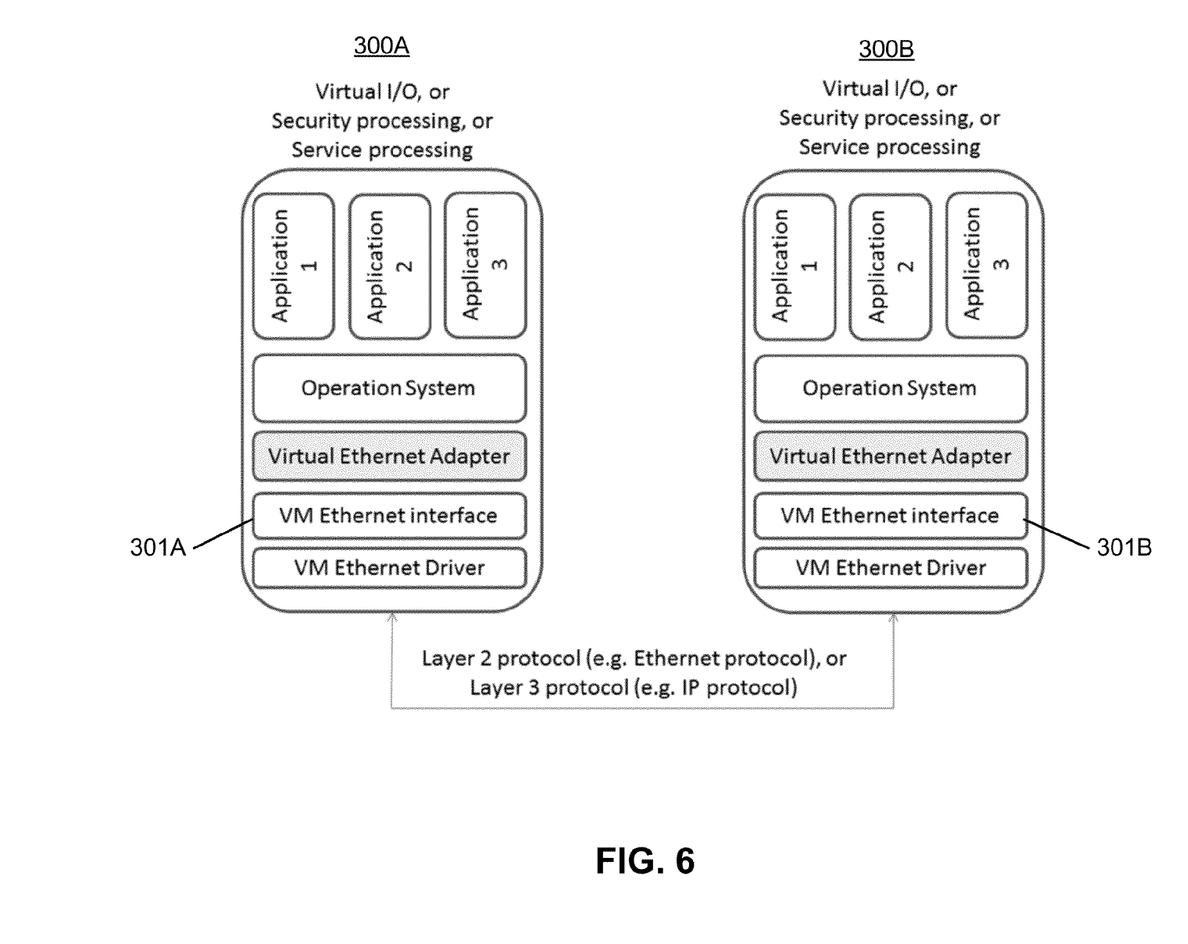
FIG. 6 is a block diagram illustrating an architecture of a processing module according to one embodiment of the invention.

FIG. 6 is a block diagram illustrating architecture of a processing module according to one embodiment of the invention. Referring to FIG. 6, any of processing modules 300A and 300B can be implemented as part of any of the firewall modules (e.g., I/O module, security processing module, or service processing module) as shown in FIG. 3. In the example as shown in FIG. 6, multiple possible communication protocols can be utilized for the packet forwarding between firewall modules. If the firewall modules are on the same layer-2 networks, the packet can be forwarded through a layer-2 protocol, such as Ethernet protocol. In this example, it is assumed that each of firewall modules 300A-300B has a dedicated virtual Ethernet interface (e.g., interfaces 301A and 301B) being used for the forwarding link and the packets are sent with Ethernet header of both sides' media access control (MAC) addresses. The packets can also be forwarded in a layer-3 protocol such as an IP protocol. During the layer-3 routing, original packets are encapsulated with another IP header, which carries the IP address of both sides. The encapsulation of the outer IP address would ensure the packets are sent, and received from the proper peer.

In one embodiment, firewall modules 300A and 300B can run on virtual machines or physical hosts. Running on virtual machines provides additional benefit that a firewall module can be added dynamically. Initially the distributed firewall may have only one virtual I/O module, one security processing module, and a central controller. When there is more traffic coming, it can add more virtual I/O modules to support increasing connections. If it needs more CPU resources to handle the security processing, it may add more security processing modules and/or add more service processing modules, to support the increasing load. This provides lots of flexibility to support various network conditions.

In one embodiment, firewall modules 300A-300B could be distributed in different networks, even on different locations, as long as the modules can reach the module that is next in terms of processing and the central controller. In one embodiment, virtual I/O modules and corresponding security processing modules are in a public cloud and the central controller is in a private cloud. This configuration may provide the flexibility to secure and control packets coming from the public cloud, and allow central controller having overall view of traffic from Internet as well as from internal network.

One of the advantages of embodiments of the present invention includes, but not limited to, that the distributed firewall can employ a significantly large amount of CPU and memory resources for service processing and protect the networks at multiple geometric locations. The central controller decides which security processing module capable of processing particular connection, and is able to start a new security processing at the place deemed best for packet processing.

As a result, the location of the packet I/O is not limited on a single appliance. The I/O modules can be placed anywhere as virtual machines. The security processing power is significantly higher as packets and connections can be load balanced to any number of the security processing modules, and the modules could be added or deleted dynamically. Using such modules in a firewall cloud provides a security design that is best-fit for the emerging cloud computing, and provides great scalability and system availability.

Figure 7:
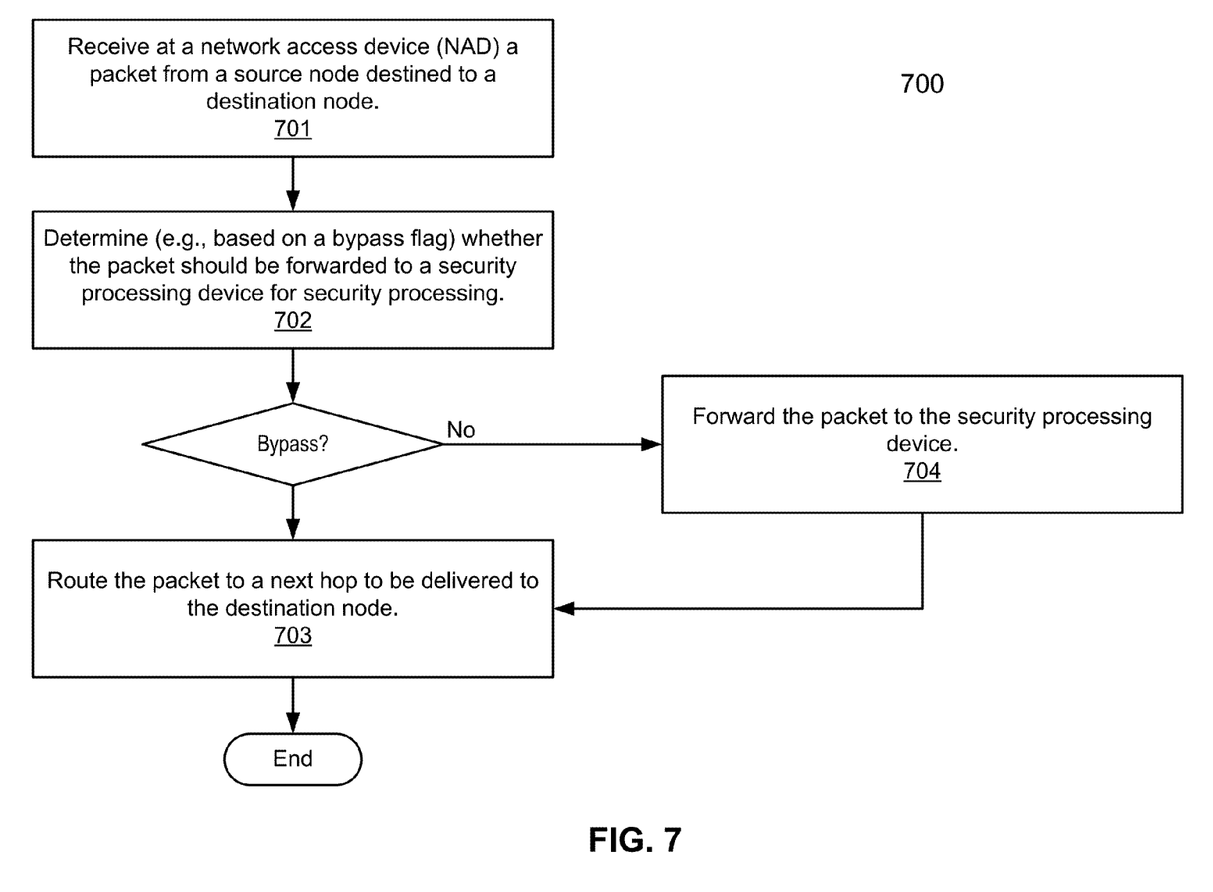
FIG. 7 is a flow diagram illustrating a method for performing firewall operations using a distributed firewall according to one embodiment of the invention.

FIG. 7 is a flow diagram illustrating a method for performing firewall operations using a distributed firewall according to one embodiment of the invention. Method 700 may be performed by processing logic that may include software, hardware, or a combination of both. For example, method 700 may be performed by distributed firewall 212 of FIG. 1. Referring to FIG. 7, at block 701, a network access device receives a packet from a source node destined to a destination node. At block 702, the network access device determines whether the packet should be forwarded to a security device for security inspection. For example, processing logic may check whether there is an entry exists in a session table for the current session. If not, it may forward the packet to the security device for security processing at block 704. Alternatively, the processing logic may check whether there is a bypass flag set to a predetermined value for the current session. If there is, the packet will not be forwarded to the security device; instead, the packet will be directly routed to the destination node at block 703.

Figure 4:
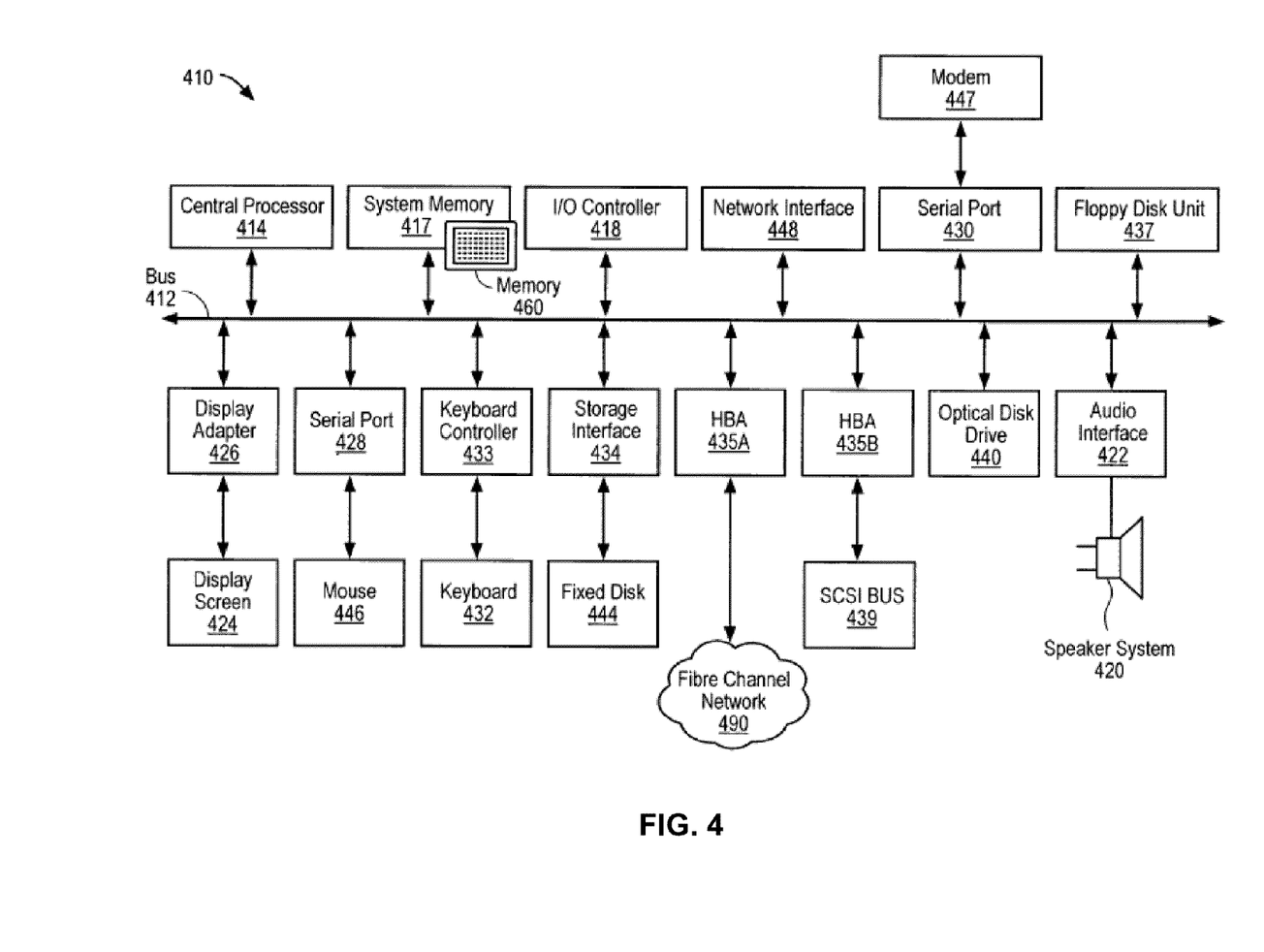
FIG. 4 is a block diagram illustrating an example of a data processing system which may be used as an embodiment of the invention.

FIG. 4 is a block diagram illustrating an example of a data processing system which may be used as an embodiment of the invention. For example, system 410 may be implemented as part of network access device 204 or alternatively, system 410 may be implemented as part of a client or server device. In one embodiment, system 410, which may operate as a gateway device, includes a memory, a second interface to receive one or more packets from the one or more virtual machines, and one or more processors. Referring to FIG. 4, gateway 410 includes a bus 412 to interconnect subsystems of gateway 410, such as a processor 414, a system memory 417 (e.g., RAM, ROM, etc.), an input/output controller 418, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems.

Modem 447 may provide a direct connection to a remote server via a telephone link or to the Internet via an internet service provider (ISP). Network interface 448 may provide a direct connection to a remote server. Network interface 448 may provide a direct connection to a remote server via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the gateway operations described herein can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

Figure 8:
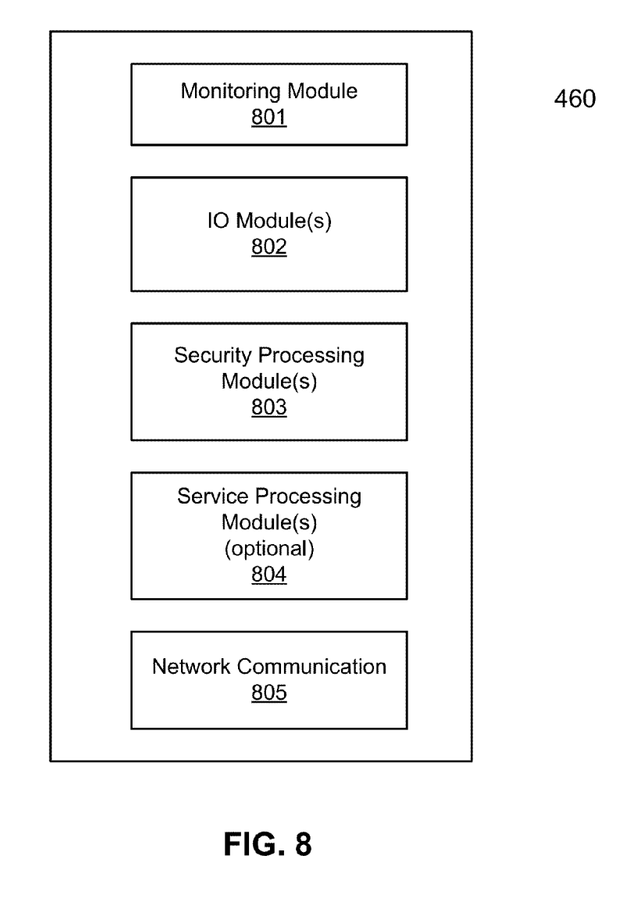
FIG. 8 illustrates a set of code (e.g., programs) and data that is stored in memory of one embodiment of a security gateway according to one embodiment.

FIG. 8 illustrates a set of code (e.g., programs) and data that is stored in memory of one embodiment of a security gateway, such as the security gateway set forth in FIG. 4. The security gateway uses the code, in conjunction with a processor, to implement the necessary operations (e.g., logic operations) to implement the described herein.

Referring to FIG. 8, the memory 460 includes a monitoring module 801 which when executed by a processor is responsible for performing traffic monitoring of traffic from the VMs as described above. Memory 460 also stores one or more IO modules 802 which, when executed by a processor, is responsible for performing forwarding inbound and outbound packets. Memory 460 further stores one or more security processing modules 803 which, when executed by a processor, is responsible for security processes on the packets provided by IO modules 802. Memory 460 also stores one or more optional service processing modules 804, which when executed by a processor performs a particular security process on behalf of security processing modules 803. The memory also includes a network communication module 805 used for performing network communication and communication with the other devices (e.g., servers, clients, etc.).

As described above, the servers in FIG. 1 may be implemented using a computer system. In one embodiment, one or more of the servers is implemented using a system such as depicted in FIG. 4 as well, except using different code to implement the techniques and operations performed by such servers and their VMs as described above. The code is stored in computer-readable storage medium such as system memory 417, fixed disk 444, optical disk 442 or floppy disk 448.

Figure 9:
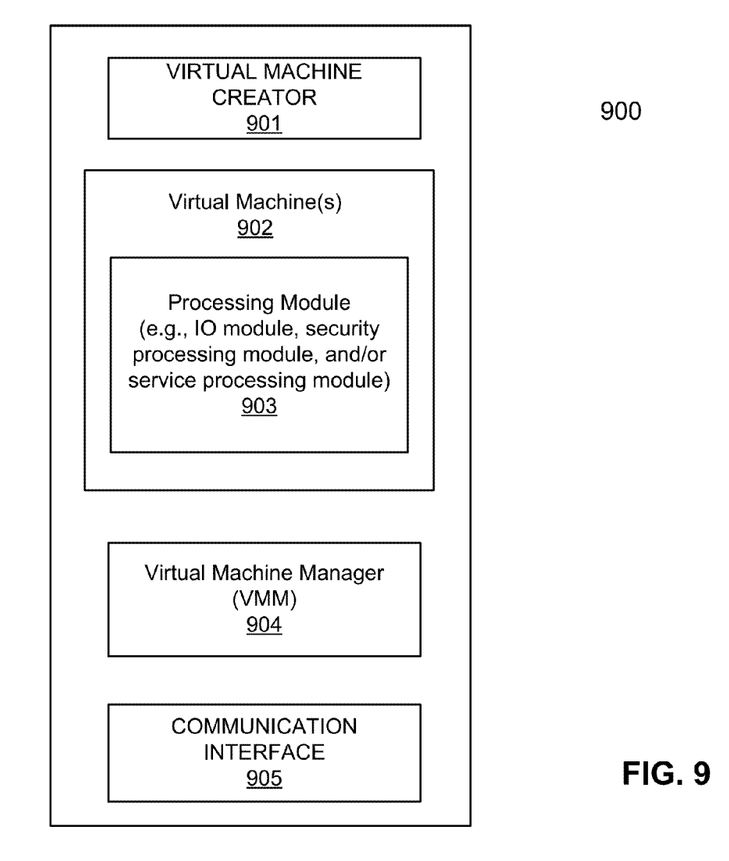
FIG. 9 illustrates a set of code (e.g., programs) and data that is stored in memory according to one embodiment.

FIG. 9 illustrates a set of code (e.g., programs) and data that is stored in one of those memories. In one embodiment of the server, such as implemented using the system shown in FIG. 4. The server uses the code, in conjunction with the processor, to implement the necessary operations to implement the discovery process depicted above, such as, for example, the operation set forth in FIG. 7. Referring to FIG. 9, the memory 900 includes virtual machine creation module 901 which when executed by a processor is responsible for creating a virtual machine on the server in a manner well-known in the art. Memory 900 also includes one or more virtual machines 902 which may be created by virtual machine creator 901. Virtual machine 902 includes a processing module 903 executed therein, which can be one or more of an IO module, a security processing module, and/or a service processing module. Memory 600 further includes virtual machine manager (VMM) 904 responsible for managing virtual machines 902. Memory 600 also includes communication interface module 605 used for performing communication with other devices (e.g., security gateway, servers, clients, etc.).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving at a network access device a packet from a source node destined to a destination node;
examining a data structure maintained by the network access device to determine whether the data structure stores a data member having a predetermined value, the data member indicating whether the packet should undergo security processing;
if the data member matches the predetermined value,
transmitting the packet to a security device associated with the network access device to allow the security device to perform content inspection, and
in response to a response received from the security device, routing the packet to the destination node dependent upon the response; and
transmitting the packet to the destination node without forwarding the packet to the security device, if the data member does not match the predetermined value.

2. The method of claim 1, further comprising:
receiving a message having a data value from the security device, the data value indicating whether the security device is to receive further packets of the same session for security inspection; and
storing the data value in the data member of the data structure.

3. The method of claim 1, further comprising:
receiving a message having a data value from a controller communicatively coupled to the network access device, the data value indicating whether the network access device should forward further packets to the security device for security inspection; and
storing the data value in the data member of the data structure.

4. The method of claim 3, wherein the controller is configured to manage, via a respective secure connection, a plurality of network access devices owned by a network owner.

5. The method of claim 4, wherein the data value is received from an administrator via a user interface of the controller.

6. The method of claim 3, further comprising configuring a set of one or more filtering rules specified by the message, wherein only certain types of packets are to be forwarded to the security device for security inspection based on the filtering rules.

7. The method of claim 1, further comprising:
   detecting a network event by the network access device;
   examining whether the network event should be notified to the security device based on a set of one or more events registered by the security device; and
   notifying the security device based on the registered events.

8. A non-transitory computer-readable medium having instructions stored therein, which when executed by a computer, cause the computer to perform a method, the method comprising: p1 receiving at a network access device a packet from a source node destined to a destination node;
   examining a data structure maintained by the network access device to determine whether the data structure stores a data member having a predetermined value, the data member indicating whether the packet should undergo security processing;
   if the data member matches the predetermined value,
      transmitting the packet to a security device associated with the network access device to allow the security device to perform content inspection, and
      in response to a response received from the security device, routing the packet to the destination node dependent upon the response; and
   transmitting the packet to the destination node without forwarding the packet to the security device, if the data member does not match the predetermined value.

9. The medium of claim 8, wherein the method further comprises:
   receiving a message having a data value from the security device, the data value indicating whether the security device is to receive further packets of the same session for security inspection; and
   storing the data value in the data member of the data structure.

10. The medium of claim 8, wherein the method further comprises:
    receiving a message having a data value from a controller communicatively coupled to the network access device, the data value indicating whether the network access device should forward further packets to the security device for security inspection; and
    storing the data value in the data member of the data structure.

11. The medium of claim 10, wherein the controller is configured to manage, via a respective secure connection, a plurality of network access devices owned by a network owner.

12. The medium of claim 11, wherein the data value is received from an administrator via a user interface of the controller.

13. The medium of claim 10, wherein the method further comprises configuring a set of one or more filtering rules specified by the message, wherein only certain types of packets are to be forwarded to the security device for security inspection based on the filtering rules.

14. The medium of claim 8, wherein the method further comprises:
    detecting a network event by the network access device;
    examining whether the network event should be notified to the security device based on a set of one or more events registered by the security device; and
    notifying the security device based on the registered events.

15. A network system, comprising:
    a security device to perform security inspection of packets; and
    a network access device coupled to the security device to receive a packet from a source node destined to a destination node,
       examine a data structure maintained by the network access device to determine whether the data structure stores a data member having a predetermined value, the data member indicating whether the packet should undergo security processing,
    if the data member matches the predetermined value,
       transmit the packet to a security device associated with the network access device to allow the security device to perform content inspection, and
       in response to a response received from the security device, route the packet to the destination node dependent upon the response, and
    transmit the packet to the destination node without forwarding the packet to the security device, if the data member does not match the predetermined value.

16. The system of claim 15, wherein the network access device is further to
    receive a message having a data value from the security device, the data value indicating whether the security device is to receive further packets of the same session for security inspection, and
    store the data value in the data member of the data structure.

17. The system of claim 15, further comprising a controller to manage the network access device and the security device, wherein the network access device is further to
    receive a message having a data value from the controller, the data value indicating whether the network access device should forward further packets to the security device for security inspection, and
    store the data value in the data member of the data structure.

18. The system of claim 17, wherein the controller is configured to manage, via a respective secure connection, a plurality of network access devices owned by a network owner.

19. The system of claim 18, wherein the data value is received from an administrator via a user interface of the controller.

20. The system of claim 17, wherein the network access device is to configure a set of one or more filtering rules specified by the message, wherein only certain types of packets are to be forwarded to the security device for security inspection based on the filtering rules.

21. The system of claim 15, wherein the network access device is further to
    detect a network event by the network access device,
    examine whether the network event should be notified to the security device based on a set of one or more events registered by the security device, and
    notify the security device based on the registered events.

* * * * *